United States Patent [19]

Pasbrig

[11] Patent Number: 4,866,250
[45] Date of Patent: Sep. 12, 1989

[54] DEVICE FOR PREHEATING LIQUID, PARTICULARLY LIQUID FUEL

[75] Inventor: Max Pasbrig, Orselina, Switzerland

[73] Assignee: Lacrex Brevetti SA, Orselina, Switzerland

[21] Appl. No.: 851,112

[22] Filed: Apr. 8, 1986

[30] Foreign Application Priority Data

Apr. 18, 1985 [DE] Fed. Rep. of Germany ....... 3514053

[51] Int. Cl.⁴ .......................... F24H 1/10; H05B 3/00; B67D 5/62; F02M 31/00
[52] U.S. Cl. ..................................... 219/299; 123/549; 210/184; 219/205; 219/302; 219/303; 219/305; 222/146.5; 431/208
[58] Field of Search ............................... 219/296–309, 219/205; 210/184–186; 123/549, 557; 431/208; 222/146.5

[56] References Cited

U.S. PATENT DOCUMENTS

| | | | |
|---|---|---|---|
| 1,120,830 | 12/1914 | Mann | 219/303 X |
| 1,514,813 | 11/1924 | Adams | 219/305 |
| 1,523,156 | 1/1925 | Adams | 219/305 |
| 1,695,227 | 12/1928 | Bolinger | 219/299 |
| 1,766,480 | 6/1930 | Blavelt | 219/299 |
| 2,011,811 | 8/1935 | Garrett | 219/299 |
| 2,103,434 | 12/1937 | Pennebaker | 210/185 |
| 2,673,919 | 3/1954 | Arvins et al. | 219/302 |
| 3,733,460 | 5/1973 | Ryckman | 219/305 |
| 4,358,664 | 11/1982 | Kronseder | 219/302 X |
| 4,522,712 | 6/1985 | Fischer et al. | 210/184 X |
| 4,687,907 | 8/1987 | Barkley et al. | 219/302 X |

FOREIGN PATENT DOCUMENTS

| | | | |
|---|---|---|---|
| 451491 | 9/1948 | Canada | 210/186 |
| 2004759 | 10/1971 | Fed. Rep. of Germany | |
| 3320903 | 2/1985 | Fed. Rep. of Germany | |
| 531009 | 10/1921 | France | 219/299 |
| 712522 | 7/1931 | France | 219/305 |
| 190072 | 6/1937 | Switzerland | 219/303 |

Primary Examiner—Anthony Bartis
Attorney, Agent, or Firm—Werner W. Kleeman

[57] ABSTRACT

A preheater for liquids, particularly fuel, includes a bowl-shaped housing provided with a bowl cover to form a closed chamber. A superficial heating chamber extends along the side wall of the housing to form at least a portion of a flow path for liquid to be preheated extending from an inlet on the cover through the heating chamber and the interior of the housing to an outlet on the cover. An electric heating foil directly contacts the exterior of the superficial heating chamber for heating the liquid flowing through the flow path and has its outer surface covered by a reflective foil and thermal insulation. A filter may be accommodated in the bowl-shaped housing to filter the liquid flowing through the flow path. Helical guide ribs in the superficial heating chamber significantly lengthen the flow path.

12 Claims, 4 Drawing Sheets

DEVICE FOR PREHEATING LIQUID, PARTICULARLY LIQUID FUEL

BACKGROUND OF THE INVENTION

The present invention broadly relates to liquid fuel supply systems and, more specifically, pertains to a new and improved construction of a liquid fuel preheater or preheater device.

Generally speaking, the device of the present invention for preheating liquids, for instance liquid fuels, is, in its more particular aspects, a preheater having a heat-exchanger adapted for the liquid to be heated to flow therethrough and comprising a surface or superficial heating chamber which is closed off on at least one side by a heat-conductive wall, and having a surface heat source which acts on this wall.

In a preheater of this general kind known from the German Patent Publication No. 3,202,533, published Aug. 4, 1983, a heat source in the form of an incandescent lamp is arranged close to a heat-conducting heating wall of a superficial heating chamber. A reflector serves to concentrate the radiation from the lamp onto the heating wall. The heating wall may, additionally, be blackened to enhance heat absorption. As a result of the liquid being conducted as a stream along a superficial or surface-like heating wall, a particularly effective heating of the liquid is achieved and by repeated variation of the cross-sectional shape of the liquid stream good intermixture of the liquid is achieved. However, widening or expansion of the layer of liquid onto a disc-shaped heating chamber, as required by a punctiform heat source, in turn entails difficulties of flow, especially at the edge zones. Moreover, with the use of such a heating element, the preheater is spatially enlarged to a significant extent.

Another preheater, especially for Diesel fuel, known from the U.S. Pat. No. 4,349,001, granted Sept. 14, 1982, provides for a flat or plate-shaped heat-exchanger in which the liquid, flowing in and out through pipes, is distributed superficially and the heating surfaces of a ribbon-shaped heating chamber thereof are formed by longitudinally-ribbed partition walls. The heat source is a heating liquid medium which flows externally along the partition walls. In this preheater, too, a flow pattern uniform over the stream width of the liquid that is to be heated is not possible and also satisfactory heat transfer cannot be achieved. Furthermore, the heating liquid medium entails the provision of an additional housing and connections and the expenditure associated therewith.

SUMMARY OF THE INVENTION

Therefore, with the foregoing in mind, it is a primary object of the present invention to provide a new and improved construction of a preheater device which does not exhibit the aforementioned drawbacks and shortcomings of the prior art constructions.

Another and more specific object of the present invention is to improve a heater exchanger of the initially mentioned type such that, as a result of it possessing a particularly favorable structure, more intensive and more uniform heating of the liquid is achieved.

Yet a further significant object of the present invention aims at providing a new and improved construction of a preheater device of the character described which is relatively simple in construction and design, extremely economical to manufacture, highly reliable in operation, not readily subject to breakdown and malfunction and requires a minimum of maintenance and servicing.

Now in order to implement these and still further objects of the invention, which will become more readily apparent as the description proceeds, the preheater device of the present invention is manifested by the features that it comprises a heat source constructed as a superficial or surface-like heating element or surface heating element which extends over a heat-conductive wall and which is disposed in direct contact with the heat-conductive wall.

By employing a surface heater or superficial heating element in the form of a heating foil or mat in the liquid fuel preheater or preheating device of the present invention, heat can be transferred uniformly over a large area. Such a heating foil also affords the possibility of developing particularly favorable heating chambers. Thus, for instance, a heating bowl can be formed which can be combined with a liquid filter, without the resultant preheater or preheating device being larger.

Providing helical guide ribs in the arrangement of the invention inside the superficial heating chamber ensures a guidance for the liquid flow which lengthens the effective heating path, intensifies the turbulent or vortex motion of the liquid and maintains uniform flow over the entire flow cross-section. Above all, the bowl shape of the preheater device makes it possible, by appropriate provision of the guide ribs, to create a particularly thin liquid film which, by helically guided circulation, in considerably lengthened in its path.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENTS

Figure 1:
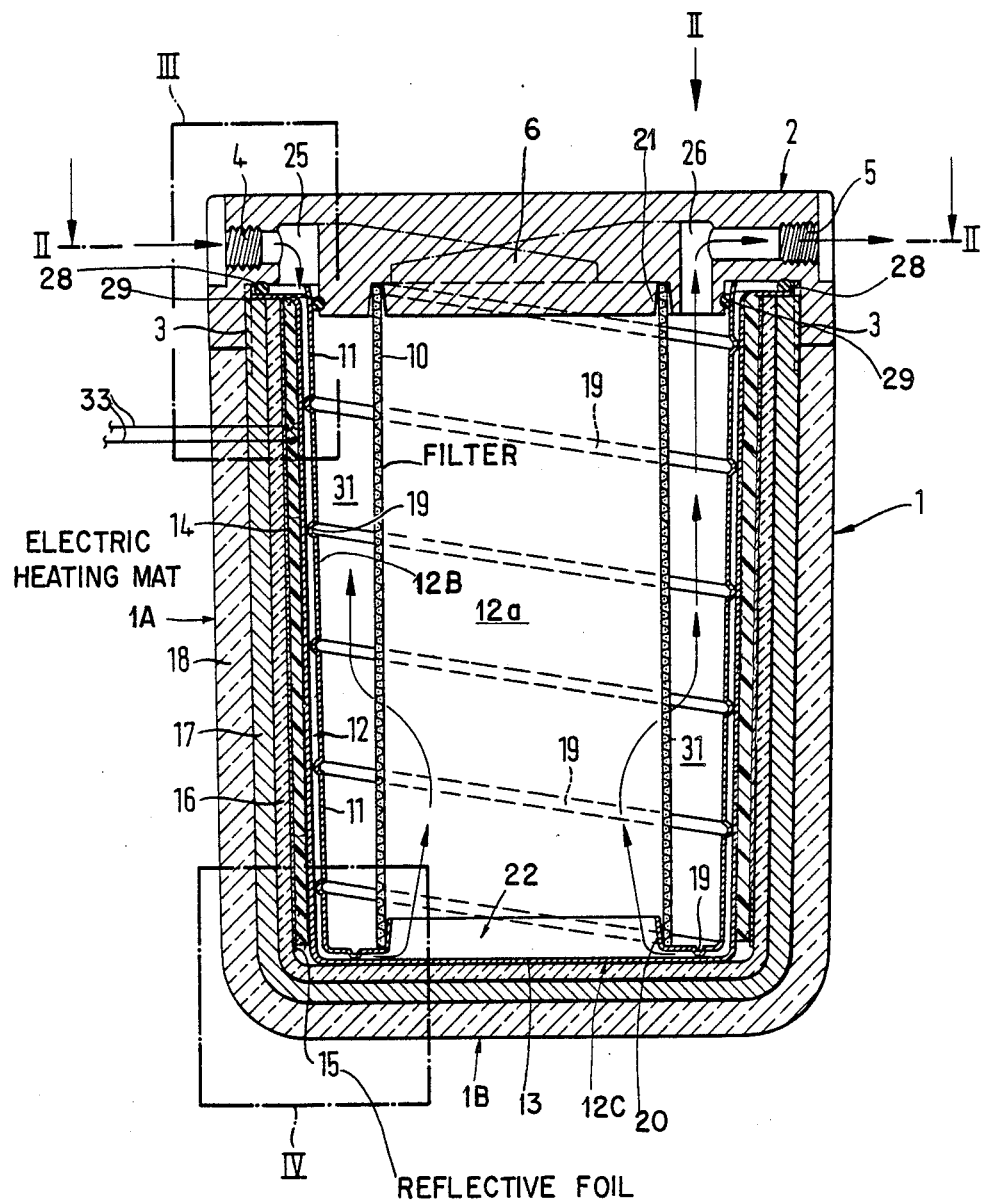
FIG. 1 is a view illustrating a substantially bowl-shaped embodiment of the preheater or preheater device of the invention in a section taken substantially along the line I—I of FIG. 2.

Describing now the drawings, it is to be understood that to simplify the showing thereof only enough of the preheater or preheater device has been illustrated therein as is needed to enable one skilled in the art to readily understand the underlying principles and concepts of this invention. Turning now specifically to FIG. 1 of the drawings, the preheater or preheater device illustrated therein is of substantially bowl-like configuration and comprises a substantially bowl-shaped housing 1 made of a suitable pressure-resistant material, onto which a bowl cover or mounting lid 2 is liquid tightly and detachably superimposed or secured to close the top of the housing 1, preferably by way of a screw thread 3. It will be understood that the designations top, bottom, upward and downward relate to the specific orientation of FIG. 1 and subsequently described Figures and do not limit the actual orientation of the preheater device. For instance, the preheater device may be installed with the housing 1 above the bowl cover or mounting lid 2. Inflow of liquid is effected at one side through inlet means constituting an inlet or afflux port 4 and an afflux or inlet channel or bend 25 which opens downwardly in the bowl cover or mounting lid 2, and which thereby communicates with a heat exchange means constituting a superficial heating chamber 12. This superficial heating chamber 12 is bounded at the inside by a metallic inner or superficial wall 11 made, for example, of copper. It is bounded at the outside by an outer or heat-conductive wall 13, advantageously likewise made of copper, which in turn is enclosed or engaged externally by a heating foil or mat 14. This heating foil or mat 14 is a surface heater or superficial heating element, in which heating resistances are applied to a carrier foil, for example by impressing or pressure application or the like, and are embedded in a covering plastic foil, so that there is present a superficial or surface-like heating element of high flexibility, which heats uniformly over the entire surface, and which can be adapted to any design form or configuration.

The outer periphery of the heating foil 14 is enclosed, in the exemplified embodiment, by a thin metal reflective foil 15 having a reflective surface on the inside, for example a polished aluminum foil, so that the heat emitted by the heating foil 14 is reflected inwards. A substantially bowl-shaped insulating wall 16 made of foam material or similar insulation material, further prevents loss of heat outwardly. Finally, a substantially bowl-shaped housing wall 17, advantageously made of aluminum, bounds the housing outwardly and can, in addition, be further covered by an outer insulating wall 18.

Figure 3:
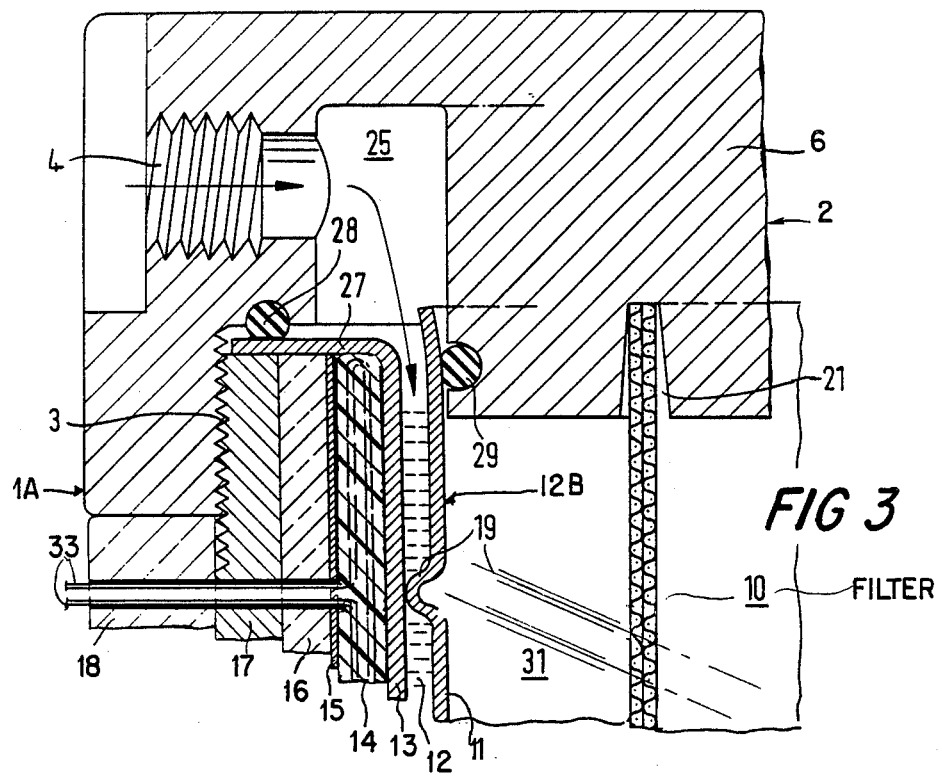
FIG. 3 is an enlarged sectional detail of the region indicated at III in FIG. 1.
Figure 4:
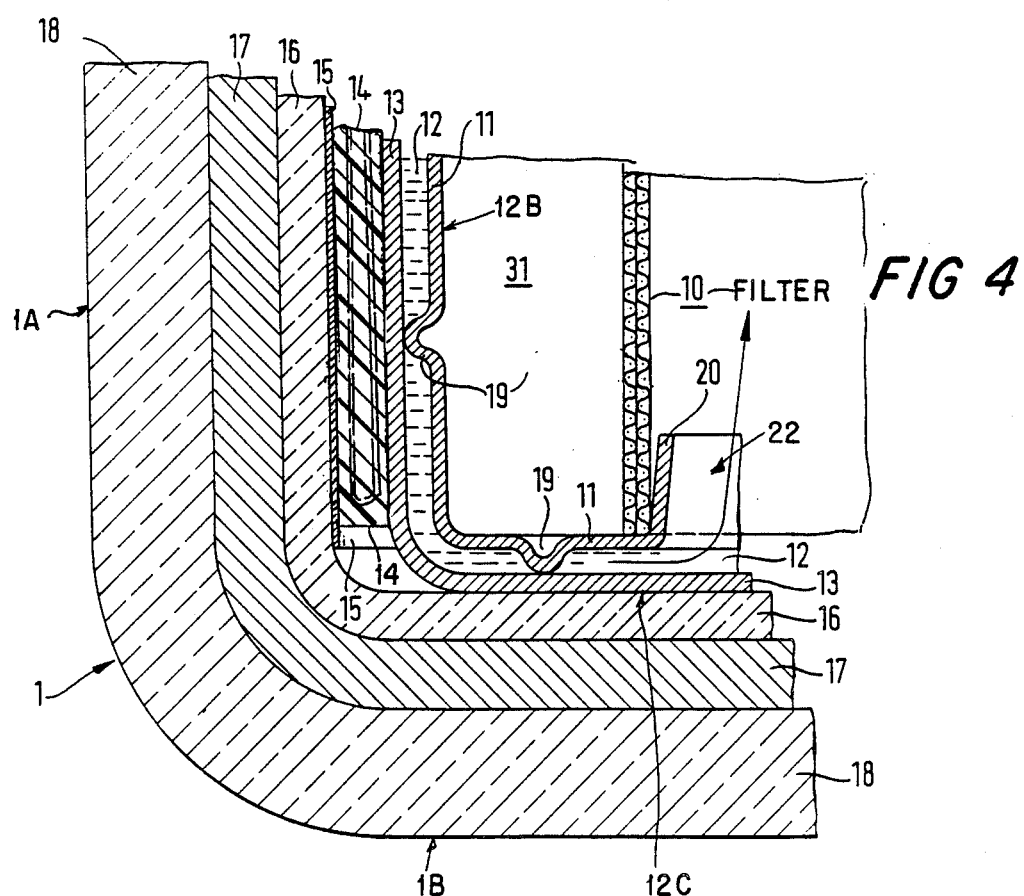
FIG. 4 is an enlarged sectional detail of the region indicated at IV in FIG. 1.

The substantially bow-shaped housing 1 comprises a substantially cylindrical portion 1A and a bottom portion 1B. Likewise, the heat exchanger constituted by the superficial heating chamber 12, comprises a substantially cylindrical portion 12B and a base portion 12C which overlies the bottom portion 1B of the substantially bowl-shaped housing 1. As the cross-sectional FIGS. 3 and 4 reveal, the various walls are deep-drawn to form bowls of respective vessels or containers which are insertable one into the other; the insulating walls 16 and 18, the bowl housing 17 and the outer or heat-conductive wall 13 are each provided with a closed base, whilst the inner superficial wall 11 has a central base opening 22 with an upstanding or base collar or flange 20. The heating foil 14, as well as also the optionally-provided reflective foil 15, extend only over a predetermined wall portion, namely the substantially cylindrical portion 1A of the preheater bowl configuration, i.e. the substantially bowl-shaped housing 1.

In the exemplified embodiment, the inner or superficial wall 11 has guide ribs or rib members 19 which are directed towards the outer heat-conductive wall 13 and which extend helically downward at a spacing from one another, in order to thus define a ribbon-shaped passage or channel 12a for a thin film of liquid. As a rule, these guide ribs 19 butt against the outer wall 13 and thereby constrain liquid to flow through the helical passage or channel 12a thus formed. If no such guide ribs 19 are provided, then liquid will flow downwards by the shortest path, in which case adequate heating can still be obtained. While the inner or superficial wall 11 of the superficial hearing chamber 12 terminates in an upwardly-facing mouth which is possibly slightly widened outwards, to permit superimposition of the bowl cover or mounting lid 2 with its core 6 with the interpositioning of an O-ring 29, the heating chamber outer heat-conductive wall 13 is turned or flanged over at the top onto the bowl walls externally thereof, to form a support flange 27, and here, too, the bowl cover or mounting lid 2 is sealed off by means of an O-ring seal 28.

Figure 2:
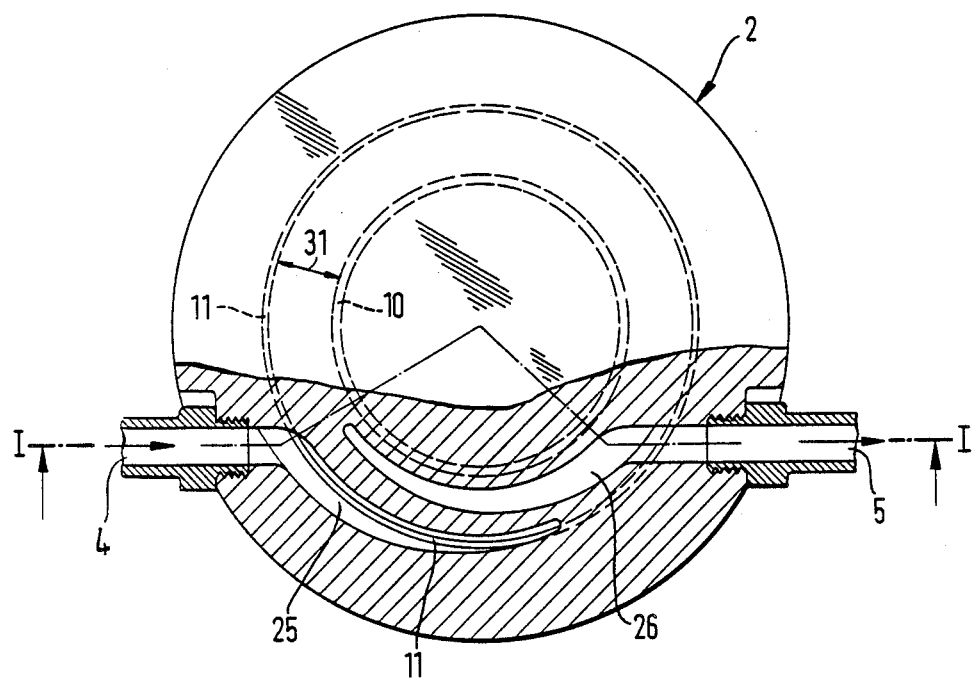
FIG. 2 is a plan view of the preheater device of FIG. 1 in partial section substantially taken along the line II—II of FIG. 1.

The exemplified embodiment exhibits a liquid filter in the form of a filter cylinder 10 centrally arranged in the interior of the preheater bowl or substantially bowl-shaped housing and which is advantageously of a commercially-available design. This filter cylinder 10 is superimposed, at the bottom, onto the base or upstanding collar or flange 20 and engages, at the top, an annular groove 21 in the bowl cover or mounting lid 2, so that this filter cylinder 10 has a firm seat. As is event from FIG. 2, outlet means constituting an efflux or outlet bend 26 is fashioned in the bowl cover or mounting lid 2, is open to an effluent collection chamber 31 between the filter cylinder 10 and the nner or superficial wall 11, for receiving filtered liquid and for causing the filtered liquid to flow away out of the preheater bowl or the substantially bowl-shaped housing 1 through an efflux or outlet connection port 5 of the outlet means and which port 5 is in flow communication with the efflux or outlet bend 26. Electrical current supply to the heating foil 14 is designated by the reference numeral 33.

The mode of operation of this embodiment of the preheater or preheater device of the invention is as follows:

The liquid that is to be preheated, such as a fuel for combustion or a fuel for powering an engine, enters through the afflux or inlet port 4 and passes by way of the afflux or inlet channel or bend 25 into the superficial heating chamber 12. The liquid is conducted downwardly through the superficial heating chamber 12 in the helically formed ribbon-shaped passage or channel 12a, if provided, and is heated by the heat emitted by the heating foil 14. As its temperature increases, the liquid, of course, becomes less viscous. The helical ribbon-shaped passage or channel 12a ensures that the liquid flows through a relatively long heating path over which the thin layer of liquid rapidly absorbs heat. The heated liquid can rise through the base opening 22 into the filter cylinder 10, pass through the filter cylinder 10 and finally pass into the effluent collection chamber 31 in which the liquid, for example under pressure induced by a suitable liquid pump (not shown), rises into the efflux or outlet channel or bend 26 and is caused to flow out through the efflux or outlet port 5. Even if no filter is present, collection of the heated liquid in the interior of the bowl substantially bowl-shaped housing 1 can be advantageous, because in this way the heat transferred from the superficial heating chamber 12 through the inner superficial wall 11 is absorbed by the accumulated liquid and thus conserved, whilst the heat energy in the interior of the substantially bowl-shaped housing 1 also enhances heating chamber efficiency.

The preheater bowl can be produced very simply by deep-drawing the component parts thereof, advantageously in a slightly conical shape, and its assembly does not present any difficulties. One of the particular advantages of the preheater bowl is that the liquid filter cylinder 10 can be accommodated therein without the preheating device itself having to be enlarged. The component parts are easy to disassemble, for example for cleaning purposes, and thus are also easily exchangeable.

Figure 5A:
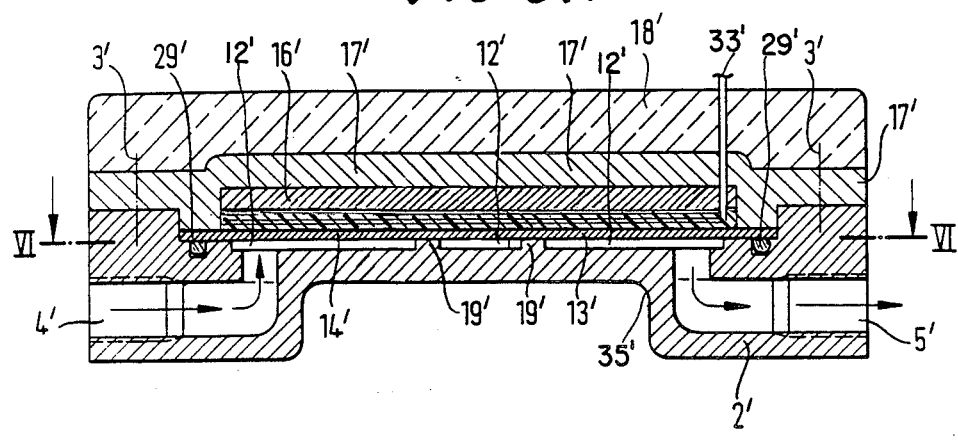
FIG. 5A is a view illustrating a discoidal or disk-like second embodiment of the preheater device of the invention in a section taken substantially along the line VA—VA of FIG. 6.
Figure 5B:
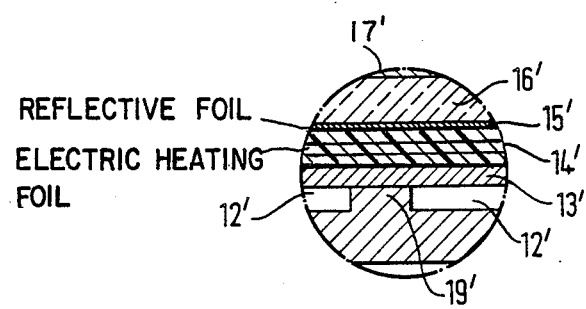
FIG. 5B shows a section through part of a modified embodiment of the discoidal or disk-like preheater device shown in FIG. 5A.
Figure 6:
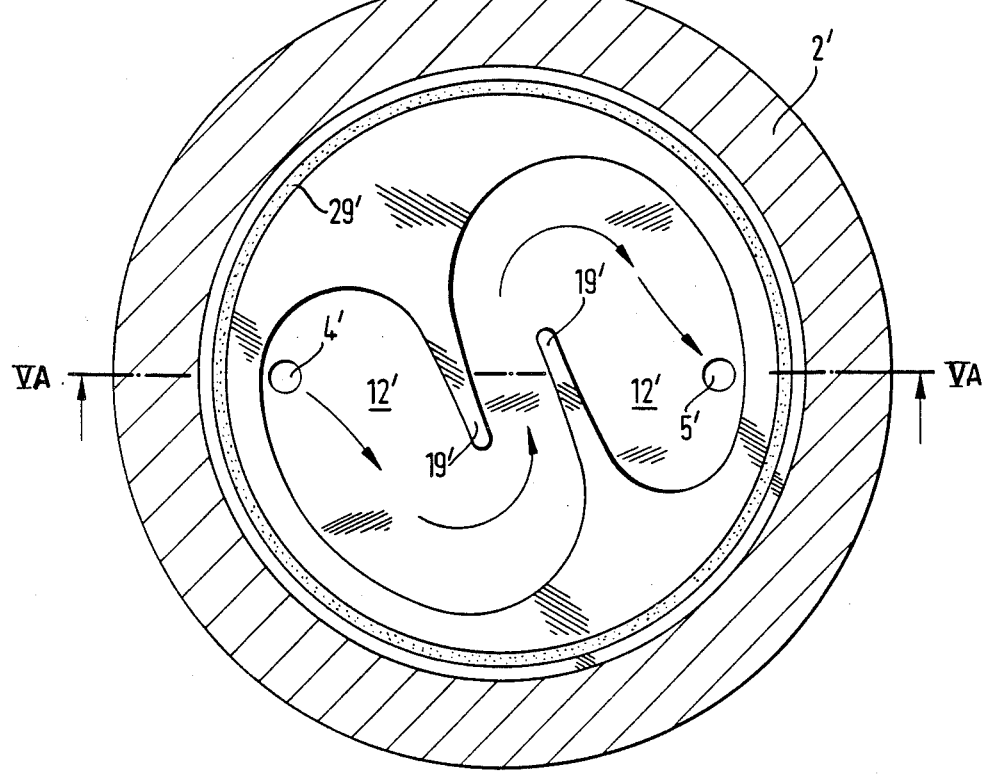
FIG. 6 is a plan view taken in section taken substantially along the line VI—VI of FIG. 5A.

A disc-shaped or discoidal preheater or preheating device according to the invention is shown in FIGS. 5A, 5B and 6. In a cover or mounting lid base 2' afflux or inlet and efflux or outlet ports 4' and 5', respectively, are formed at opposite sides, for example in such a way that they are at a somewhat lower level relative to the center of the cover or mounting lid base 2', so that there is a discoidal or disc-shaped recess 35' into which, optionally, an additional heat source (not shown), for example in the form of a liquid constant-flow heater or the like, can be inserted.

The heating chamber 12' is formed in the discoidal surface of this cover or mounting lid base 2'. By appropriate design, the heating chamber 12', in conjunction with guide ribs 19', has an approximately S-shaped configuration (FIG. 6). This permits the flow path between the afflux or inlet port 4' and the efflux or outlet port 5' to be significantly lengthened as compared with a direct path between the ports 4' and 5' and also causes successive flow deflection, thereby creating a vortex motion or turbulence in the thin layer of liquid which passes therethrough. This heating chamber 12' is, in turn, covered by an outer wall 13', for example made of copper, against which a heating foil 14' butts. Outward heat emission is largely counteracted by an insulating layer or wall 16' which directly rests on the heating foil 14'. In the modified embodiment illustrated in FIG. 5B and which modified embodiment otherwise is constructed analogously to the disc-shaped or discoidal preheater shown in FIG. 5A, a reflective foil 15' is interposed between the heating foil 14' and the insulating layer or wall 16'. A mounting lid housing 17' engages over and covers these layers and forms, conjointly with the cover or mounting lid base 2', an aligned or concentric closure. Advantageously, the cover or mounting lid base 2' and the mounting lid housing 17' are bolted together by merely schematically indicated bolts 3'. Advantageously, also, an O-ring seal 29' is provided therebetween. Additionally, a further insulating wall or cap 18' may be applied to the mounting lid housing 17'. The electrical current supply to the heating foil 14' is designated by the reference numeral 33'.

Although the preheater or preheating device in this illustrated example is discoidal in configuration, it will be evident that the heating chamber 12' could, if desired, be accommodated in a square, rectangular, oval or other suitably shaped housing. Finally, the possibility also exists of providing an additional heating foil on the inner wall 11 in the case of the preheater bowl of FIGS. 1 to 4, or in the cover or mounting lid base 2' in the case of the discoidal preheater or preheating device of FIGS. 5 and 6, thus heating the heating chamber 12 or 12' from both sides thereof.

While there are shown and described present preferred embodiments of the invention, it is to be distinctly understood that the invention is not limited thereto, but may be otherwise variously embodied and practiced within the scope of the following claims.

What I claim is:

1. A device for preheating a liquid, comprising:
a substantially bowl-shaped housing having a predetermined wall portion;
a bowl cover liquid-tightly and detachably secured to said substantially bowl-shaped housing to form a closed chamber;
said bowl cover containing inlet means for the liquid to be preheated and outlet means for preheated liquid;
heat exchanging means in said chamber extending along said predetermined wall portion of said substantially bowl-shaped housing for heat exchanging contact with said liquid to be preheated;
said heat exchanging means together with said bowl-shaped housing defining at least a portion of a flow path for the liquid to be preheated and which flow path extends from said inlet means of said bowl cover through the heat exchange means and the interior of said substantially bowl-shaped housing to said outlet means of said bowl cover;
said heat exchanging means including a heat-conductive wall;
a heat source for heating said heat-conductive wall; and
said heat source comprising a superficial heating element extending over said heat-conductive wall in direct contact therewith.

2. The device as defined in claim 1, wherein:
said superficial heating element comprises electric resistance heating foil.

3. The device as defined in claim 2, further including:
a substantially bowl-shaped insulating wall;
a substantially bowl-shaped housing wall;
said substantially bowl-shaped insulating wall and said substantially bowl-shaped housing wall being inserted into each other and constituting said substantially bowl-shaped housing;
said heating foil abutting against an outer surface of said heat-conductive wall; and
said heating foil being externally engaged by said predetermined wall portion of said substantially bowl-shaped housing.

4. The device as defined in claim 5, further including:
a reflective foil; and
said reflective foil defining an inwardly-reflective wall provided between said heating foil and said predetermined wall portion of said substantially bowl-shaped housing.

5. The device as defined in claim 1, wherein:
said superficial heating element has an outer surface; and
a reflective foil covering said outer surface.

6. The device as defined in claim 1, wherein:
said heat exchanging means includes a superficial heating chamber defining said portion of said flow path communicating said inlet means in said bowl cover through the interior of said substantially bowl-shaped housing with said outlet means in said bowl cover;
said superficial heating chamber including at least one superficial wall bounding said superficial heating chamber on a side opposite to said heat-conductive wall; and
said at least one superficial wall being equipped with guide ribs cooperating with said heat-conductive wall for lengthening said superficial heating chamber.

7. The device as defined in claim 6, wherein:

said predetermined wall portion of said substantially bowl-shaped housing constitutes a substantially cylindrical portion with an outer side;

said superficial heating chamber having a substantially cylindrical portion with an outer side;

said superficial heating element being provided on said outer side of said substantially cylindrical portion of said superficial heating chamber; and said inlet means and said outlet means in said bowl cover respectively containing an afflux channel and an efflux channel flow communicating with said superficial heating chamber.

8. The device as defined in claim 7, wherein:

guide ribs are provided in said superficial heating chamber; and said guide ribs delimit in said superficial heating chamber a helical flow channel.

9. The device as defined in claim 8, wherein:

said substantially bowl-shaped housing having a bottom portion;

said superficial heating chamber having a base portion overlying said bottom portion of said substantially bowl-shaped housing;

said superficial wall of said heating chamber having, in the base portion of said superficial heating chamber, a base opening through which said superficial heating chamber flow communicates with the interior of said substantially bowl-shaped housing; and said interior of said substantially bowl-shaped housing being in flow communication with said efflux channel of the outlet means in said bowl cover.

10. The device as defined in claim 9, further including:

a liquid filter disposed in the interior of said substantially bowl-shaped housing;

said liquid filter and said superficial wall of said superficial heating chamber conjointly defining therebetween an effluent collection chamber for filtered liquid;

said superficial heating chamber flow communicating with said effluent collection chamber through said liquid filter; and said efflux channel of said outlet means in said bowl cover being connected to said effluent collection chamber.

11. The device as defined in claim 10, wherein:

said liquid filter comprises a filter cylinder having a first end and a second end;

a base collar surrounding said base opening formed in said superficial wall in the base portion of said superficial heating chamber;

an annular groove being formed in said bowl cover on a side facing the interior of said substantially bowl-shaped housing; and said filter cylinder being located at said first end on said base collar and engaging with said second end said annular groove.

12. The device as defined in claim 11 wherein:

said afflux channel comprises an inlet bend provided in said bowl cover;

said efflux channel comprising an efflux port and an outlet bend;

said afflux port merging into said inlet bend to open towards said heating chamber; and said efflux port merging into said outlet bend to open towards said effluent collection chamber.

* * * * *

UNITED STATES PATENT AND TRADEMARK OFFICE
CERTIFICATE OF CORRECTION

PATENT NO. : 4,866,250
DATED : September 12, 1989
INVENTOR(S) : MAX PASBRIG

It is certified that error appears in the above-identified patent and that said Letters Patent is hereby corrected as shown below:

Column 4, line 9, after "superficial" please delete "hearing" and insert --heating--

Column 4, line 21, after "housing" please insert --1--

Column 4, line 31, after "the" (second occurrence) please delete "nner" and insert --inner--

Column 4, line 64, before "substantially" please delete "bowl"

Column 6, line 46, (claim 4) after "claim" please delete "5" and insert --3--

Signed and Sealed this

Twenty-seventh Day of November, 1990

*Attest:*

HARRY F. MANBECK, JR.

*Attesting Officer*     *Commissioner of Patents and Trademarks*